Aug. 13, 1940.     S. F. ARBUCKLE     2,211,043
BRAKE MECHANISM
Original Filed Dec. 22, 1932
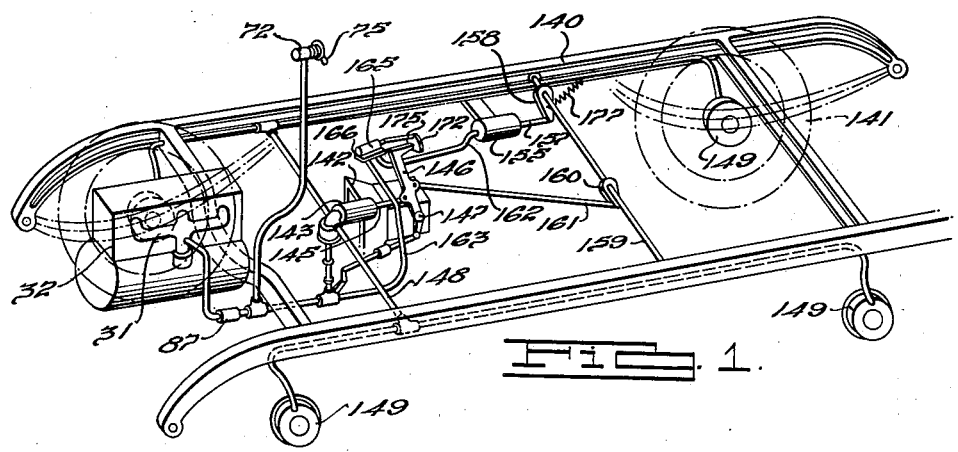
Fig. 1.
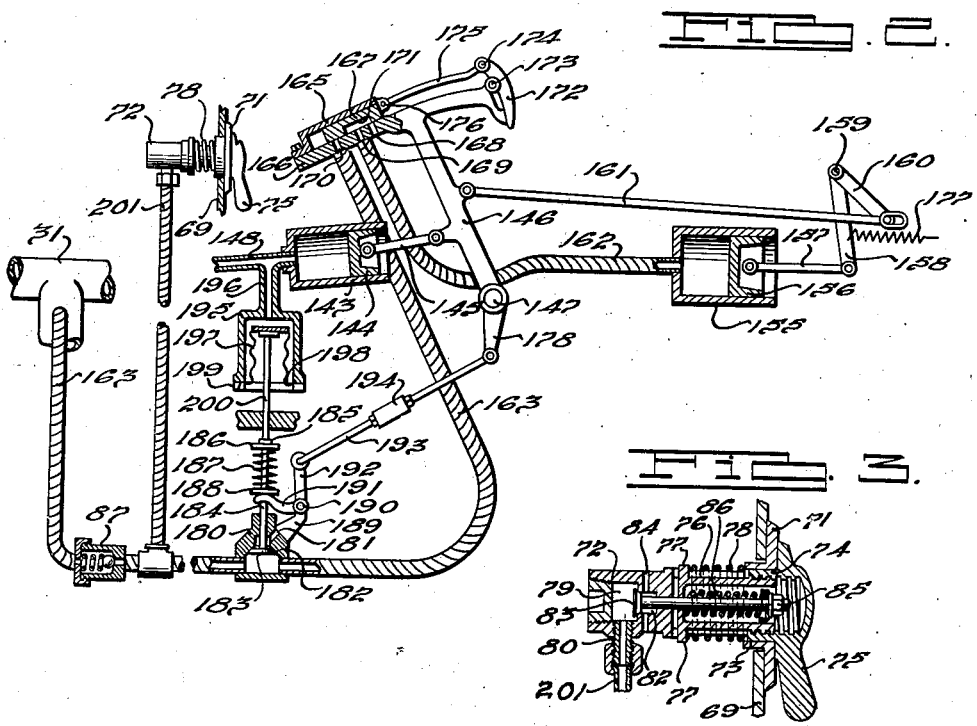
Fig. 2.
Fig. 3.
INVENTOR.
Samuel F. Arbuckle.
BY
Harness, Dickey, Pierce & Hann
ATTORNEYS.

Patented Aug. 13, 1940

2,211,043

UNITED STATES PATENT OFFICE 2,211,043

BRAKE MECHANISM

Samuel F. Arbuckle, Highland Park, Mich., assignor to S. F. Arbuckle Corporation, Detroit, Mich., a corporation of Delaware Original application December 22, 1932, Serial No. 648,510, now Patent No. 2,079,588, dated May 11, 1937. Divided and this application March 25, 1937, Serial No. 132,951

9 Claims. (Cl. 188—152)

This invention relates to brake mechanism and more especially to mechanism of this character which employs suction actuated means for aiding in the application of brakes. This invention is an improvement on the construction shown in Letters Patent of the United States No. 1,908,214 for Brake mechanism, issued May 9, 1933, to the present applicant and Andrew L. Vargha, and Letters Patent of the United States No. 1,834,368 for Brake mechanism, issued to the present applicant, December 1, 1931, and is a division of my co-pending application Serial No. 648,510, filed December 22, 1932, for Brake mechanism, issued May 11, 1937, as Patent No. 2,079,588.

The principal object of the present invention is to improve the construction and control of brake mechanism of the above character.

Another object is to provide, in combination with a brake system and booster mechanism therefor, means controlled by suitable operation of the brake pedal for varying the amount of brake pressure which the booster mechanism may exert upon the brake system and pressure responsive means controlled independently of movement of the brake pedal for limiting the amount of such braking pressure.

Another object is to provide automatically adjusted means and adjustable pressure responsive means independent of the automatically adjusted means for controlling and limiting the effective power application of vacuum operated brakes.

Other objects, features and advantages will become apparent from the following description and appended claims taken in connection with the accompanying drawing in which, for the purpose of illustrating the genus of the invention, a concrete embodiment is depicted.

In the drawing:

Figure 1 is a more or less diagrammatic perspective of a portion of an automotive vehicle chassis showing the application of a booster mechanism and control apparatus therefor as applied to a hydraulic braking system;

Fig. 2 is a more or less diagrammatic vertical section of the booster mechanism and control apparatus therefor shown in Fig. 1, and Fig. 3 is a vertical section taken longitudinally through the center of a manually controlled member for limiting the effect of pressure which may be applied by the booster mechanism and accordingly limiting the effective power which may be applied by the hydraulic brake system.

In the application of power operated brake mechanisms to motor vehicles, it is desirable to permit the maximum braking effort which may be applied by the braking means to be easily and quickly varied, whereby an excess of power application of the brakes will be prevented under conditions where such excessive application is hazardous, such as, for example, on wet or icy surfaces. The present invention contemplates the provision of a manually controlled mechanism whereby the maximum pressure which may be exerted by a vacuum or suction operated booster mechanism on a hydraulic braking system may be easily and quickly adjusted so as to prevent the wheels from locking under varying conditions of road surface. The invention further contemplates the provision of means for utilizing the higher values of vacuum developed in the engine intake manifold in the operation and control of the booster system employed in conjunction with the hydraulic braking system and further contemplates the provision of means for limiting the application of the power actuated braking means so arranged as to provide quick action of such limiting and controlling means.

Referring to the drawing, and particularly to Figs. 1 and 2 there is shown the preferred arrangement of the present invention as employed in connection with a hydraulic braking system for a motor vehicle. In these figures, conventional motor vehicle chassis frame 140 is provided with the usual wheels 141. Mounted upon the engine transmission housing 142, or upon another suitable base or support, is a cylinder 143 usually known as the master cylinder, in which is received the piston 144 which is connected by a link 145 to the brake pedal 146 suitably mounted upon the shaft 147 for oscillating movement. The master cylinder 143, which may be of any conventional design, is connected through tubes, such as 148, to the brake mechanism, indicated generally at 149 and mounted for cooperation with each of the wheels 141. The brake mechanism 149 may take any of the conventional forms of mechanism usually employed for braking purposes. In conventional operation, when it is desired to apply the brakes, the foot pedal 146 is depressed thereby moving the piston 144 in cylinder 143 and causing the liquid therein to be forced through the tubes 148 to the various brake mechanisms 149 and there to apply pressure for causing application of the brake mechanisms.

In the conventional hydraulic brake system it will be possible to apply to these various mechanisms 149 pressure proportional to the pressures that are applied to the foot pedal 146, the pressures being applied at the brakes being dependent upon the diameter of the cylinder 143 and the relative distance between the shafts 147 and the point of connection of the link 145 with the pedal 146 as well as the diameter of the brake applying cylinders included in the brake mechanisms 149 and the effective length of the pedal 146. The pressures which may be applied to the foot pedal 146 are necessarily limited to the strength and the effort exerted by the operator of the vehicle, and where such hydraulic brake systems are applied to motor vehicles of the truck or bus type, it is usually desirable, in order to obtain the braking effect desired, to provide means for applying a greater pressure to the liquid of the brake system than is possible solely by foot pressure. Accordingly, the so-called vacuum booster mechanism may be employed to assist in the application of the brake mechanism.

This booster mechanism preferably includes a cylinder 155 which may be suitably mounted on the chassis frame 140, or other suitable base or support, and in which cylinder a piston 156 is received. The piston 156 may be connected by a link such as 157 and a lever 158 to a cross-shaft such as 159 at its end in the opposite sides of the frame of the chassis 140. The shaft 159 is in turn connected to the pedal 146 through a lever arm 160 and a link 161. The interior of the cylinder 155 communicates through the conduits 162 and 163 with the interior of the intake manifold 31 of the internal combustion engine 32 which forms the motive power unit of the vehicle. A valve mechanism is inserted between the conduits 162 and 163 in order to control the application of the suction from the intake manifold to the vacuum actuated cylinder 155. This valve is shown in detail in Fig. 2 and comprises a housing 165 carried on an extension 166 of the foot pedal 146, and in housing 165 and such extension 166, a valve member 167 is slidably received. The extension 166 is provided with openings 168, 169 and 170, the opening 169 communicating directly with the conduit 162, the opening 170 communicating directly with the conduit 163, and the opening 168 communicating directly with the atmosphere. The valve member 167 has a recess 171 in its lower side which, in the illustrated position of the valve member, bridges the openings 168 and 169 so as to connect the interior of the cylinder 155 with the atmosphere when the valve member is in such unoperated position, the communication through the valve being cut off at this time at the opening 170. Sliding movement of the valve member 167 is controlled by a pad member 172 pivotally mounted on the foot pedal 146 at 173 and which pad is also pivotally connected at 174 with a link 175 which in turn is pivotally attached to the valve member 167 at pivot 176.

The pad 172 may be rocked about the pivot 173 independently of the movement of the foot pedal 146 to control the application of the booster mechanism through suitable movement of the valve member 167. When the pad is rotated in a counter-clockwise direction from the position shown in Fig. 2, the valve member 167 is moved to an operating position in which the recess 171 bridges the openings 169 and 170, and thus connects the interior of the cylinder 155 with the source of suction 31, the valve member 167 cutting off communication with atmosphere at such time by blocking the opening 168. Evacuation of the vacuum actuated power cylinder 155 causes the piston 156 to approach the closed end of the cylinder and the piston, acting through the link 157, lever arm 158, shaft 159, lever arm 160, and link 161 moves the foot pedal 146 towards brake-applying position. The braking power developed by the suction or partial vacuum in the intake manifold may be augmented by manually pressing the brake pedal 146 forwardly. When the brake pedal is released and the pad is rotated to its initial position, as illustrated in Fig. 2, the brake pedal moved to its normal rearward position to which it has been returned partly by the pressure in the hydraulic system and partially by a spring 177 which is secured at one end to the frame of the chassis 140 and at its other end to the lever 158. The return movement of the pad 172 shifts the valve member 167 to an inoperative position so that the recess 171 again bridges the openings 169 and 168 thereby admitting air at atmospheric pressure into the vacuum actuated power cylinder 155, the valve member 167 blocking the opening 170 at this time.

In order to prevent an excessive application of the booster mechanism to the hydraulic braking system and to control the amount of force exerted by the booster mechanism upon the hydraulic system relative to the extent that the brake pedal is depressed, the following mechanism is provided. The small housing 180 is connected into the suction line 163 between the cylinder 155 and the intake manifold 31. While this housing might be connected into the suction lines at any point, it is preferably disposed in the suction line 163 at a point adjacent the intake manifold 31 so that the action of the valve means disposed in such housing will be quick and constant. This housing is provided with an opening 181 leading to the atmosphere, and between the opening 181 and the point of entrance of the suction line 163 into the housing, a valve seat 182 is formed. The valve 183 is adapted to engage the valve seat 182 and is provided with an upwardly extending stem 184. Adjacent its top, the stem is provided with a collar 185 secured against relative axial movement to the stem. The coil spring 187 encircles the stem 184 and is held under compression between the washer 186 and a second washer 188 encircling the stem 184 but freely slidable in an axial direction thereon. The compression of the spring 187 controls the point at which the suction within the tube 163 will cause the valve 183 to open, and when the valve 183 does open, air will be drawn into the housing through the opening 181 and thereby prevent a higher degree of suction from being built up in the tube 163, thus limiting the degree of suction that may be applied to the vacuum actuated power cylinder 155.

The force exerted by the spring 187 in holding the valve 183 against its seat 182 is controlled in accordance with the extent of depression of the pedal 146 in the following manner. A bracket 189 is formed on the housing 180 and has pivotally connected thereto by means of a pin 190, a bell crank lever having a horizontally extending arm 191, and a vertically extending arm 192. The free end of the arm 191 is provided with an upper curved face and is formed so as to receive the stem 184 within it, the upper curved face serving as a stop for limiting the downward movement of the washer 188 of the valve stem 184. The free end of the vertically extending arm 192 of the bell crank is connected by means of a rod 193 to the end of the downwardly extending arm 178 of the pedal 146. The rod 193 preferably includes a turnbuckle 194 for adjustably controlling the effective length of the rod 193. It will be apparent that in this construction, the farther the pedal 146 is depressed, the higher the washer 188 will be moved from the stem 194 and consequently the greater will be the compression of the spring 187 and, accordingly, a greater degree of suction will be permitted to be built up in the suction line 163. Thus, by suitably controlling the depression of the pedal 146 by the foot, the operator of the vehicle may control the amount of force which the booster mechanism can exert upon the vehicle braking system, and, consequently, may control the amount of braking action.

It is also desirable that means operable in response to pressure developed within the hydraulic system be provided whereby excessive pressure within said hydraulic system will cause the admission of air to the suction system of the booster mechanism and relieve the application of the booster mechanism upon the braking system. It is also desired that the pressure within the hydraulic system which will cause such admission of air will also vary in accordance with the extent of pedal depression. To this end, the housing 195 is provided, the interior of which is connected to the tube 196 and to this tube with the interior of the tube 148 in which the fluid employed in the brake operating mechanism flows. The housing 195 is provided with an open end through which is inserted an expansible and contractible member 197, preferably in the form of a metallic bellows as illustrated. This bellows is provided with an outwardly extending flange 198 at its open end, which is clamped to the housing 195 through a ring clamp 199 and thereby acts to shield the open end of the housing 195. The closed ends of the bellows 197 is provided with a downwardly depending stem 200 which terminates at a point adjacent but in slightly spaced relationship with respect to the collar 185 provided on the stem 184 of valve 183.

In the above construction it will be apparent that the forces tending to move the valve 183 downwardly and thereby admit air into the vacuum system of the booster mechanism will be the vacuum pressure built up in the suction line 163 and the positive pressure developed within the pressure line 148 of the hydraulic braking system. The forces tending to oppose opening of the valve 183 will be the spring 187, the compression of which varies in accordance with the extent of depression of pedal 146, the tendency of the metallic bellows 197 to maintain its extended position due to atmospheric pressure within its inner surface and the inherent tendency of the metallic bellows 197 to remain in that extended position. Thus, to open the valve 183, the suction within the line 163 must attain a sufficiently low value, or the pressure within the fluid pressure line must reach a certain positive value, or both, in order to overcome the metallic bellows and the spring 187 on simply the compression of the spring 187 in the condition of compression to which it has been placed by the depression of the pedal 146. The compression of spring 187, as previously pointed out, may be adjusted by means of the turnbuckle 194.

It is also desired to provide in the present construction means for limiting the maximum available braking effort which may be applied by the booster mechanism, and such means is to be made adjustable and readily controllable by the driver from his normal driving position. To this end, a suction operated valve is connected by a conduit 201 to the suction line 163 at a point relatively close to the intake manifold 31. A check valve 87 is disposed between the connection of the conduit 201 and the conduit 163 to maintain the vacuum within the suction line of the booster mechanism at values corresponding to or approaching the higher degrees of vacuum developed within the intake manifold 31. The construction of the suction operated valve is shown in detail in Fig. 3. The suction operated regulating valve is mounted on the instrument panel, dash, or other suitable supporting surface 69 of a motor vehicle, in a position such that it is readily accessible to the driver. In the preferred construction of this valve, a flange-like member 71 is provided with a rearwardly extending body 72 at the forward end of which is formed an opening 73 which opens on the face of the flange portion 71, a sleeve 74 provided with a handle 75 being rotatably received in the forward end of such body portion 72. Axially directed slots are removed from diametrically opposed portions of the wall of the body 72 surrounding the opening 73 and a sleeve 76 is disposed in the opening 73. The forward end of this sleeve threadably engages the inner surface of the sleeve portion 74. The sleeve 76 is provided with a pair of outwardly projecting fingers 77 arranged in said axially directed slots in the body 72 which prevents rotation of the sleeve 76 in the opening 73, said fingers also serving as an abutment for the spring 78 which is held under compression between such abutment and the shoulder formed by cutting away a portion of the wall of the body portion 72. Thus, by turning the handle 75, the sleeve 76 is caused to move axially either one way or the other, depending upon the direction of rotation of the handle 75. The rear end of the body portion 72 is provided with a chamber 79 formed by drilling out the same and then plugging the end thereof. The chamber 79 may be connected by a fitting 80 and conduit 201 with the suction line 163 extending between the brake applying cylinder 155 of the booster mechanism and the source of suction 31, previously described. The body 72 is also provided with a chamber 82, communication between the chamber 82 and the chamber 79 being normally cut off by the valve 83. The chamber 82 is connected with the atmosphere through passages 84. The stem of the valve 83 slidably extends into the opening 73 through the closed end of the sleeve 76 and is provided at its free end with a nut 85. A coil spring 86 is held under compression about the valve stem between the nut 85 and the closed end of sleeve 76. When the suction within the conduit 201 and suction line 163 becomes sufficiently great, the valve 83 is lifted from its seat, thereby admitting air into the conduit 201 through the passages 84 and the chambers 82 and 79, preventing greater suction from being obtained than that for which the regulating valve is set. The degree of suction necessary to lift the valve 83 from its seat is, of course, controlled by the compression of the spring 86 and this compression is, in turn, controlled by the relative disposition of the closed end of the sleeve 76 with respect to the nut 85. Inasmuch as this relative position of the closed end of the sleeve 76 is controlled by the rotative position of the handle 75, it is readily apparent that by rotating the handle 75, the degree of suction which may be built up in the booster mechanism for operating the hydraulic braking system may be controlled. Thus, by rotating the handle 75 in one direction, the compression of the spring 86 will be decreased thus permitting the valve 83 to unseat at a relatively small degree of suction in the conduit 201 and suction line 163, and thereby limit the amount of force exerted by the booster mechanism upon the hydraulic brake system, such as, for instance, that amount commensurate with that necessary to apply the brake of a motor vehicle on an icy pavement without causing the wheels to slide. Conversely, if the handle 75 is rotated in the reverse direction, the spring 86 will be placed under a greater compression which will consequently cause a greater degree of suction to be built up in the conduit 201 and the suction line 163 before the valve 83 lifts and limits the degree of suction which may be built up in the booster mechanism. In this manner the effective braking effort which may be applied by the hydraulic braking system may be easily, quickly, and readily controlled by simply rotating the handle 75 to the desired position and the braking effort of the hydraulic brake system may be varied to correspond with the condition of the road surface over which the vehicle may be traveling.

As many changes may be made in the above constructions and many apparently widely different embodiments of this invention could be had without departing from the spirit thereof, it is intended that all matter contained in the above description or shown in the accompanying drawing shall be interpreted as illustrative and not in a limiting sense.

What is claimed is:

1. In combination with a hydraulic braking system, a booster mechanism operatively connected to said system, an operating valve means including a second valve for limiting the amount of force applicable by said booster mechanism to said hydraulic braking system, means responsive to pressures developed in the hydraulic braking system for moving said second valve, and a third valve in said booster mechanism operable independently of pressures developed in said hydraulic system for limiting the amount of force applicable by said booster mechanism.

2. In combination with a hydraulic braking system, a booster mechanism operatively connected to said system, an operating valve means including a second valve for limiting the amount of force applicable by said booster mechanism to said hydraulic system, means responsive to pressures developed in the hydraulic system for moving said second valve, a third valve in said booster mechanism operable independently of pressures developed in said hydraulic system for limiting the amount of force applicable by said booster mechanism, and manually adjustable means disposed at a point remote from said second named valve for controlling the operation of said third valve.

3. In combination with a hydraulic braking system, a vacuum booster mechanism operatively connected to said system, an operating valve for controlling the application of said booster mechanism, a second valve operable by vacuum for limiting the degree of suction applicable to said booster mechanism, means responsive to the hydraulic pressures in said system for opening said second valve, and another means for limiting the degree of suction applicable to said booster mechanism independently of pressures developed in said hydraulic system.

4. In combination with a hydraulic braking system, including a pedal, a vacuum booster mechanism operatively connected to said hydraulic system, means for controlling the application of said booster mechanism, a valve operatively connected to said booster mechanism and urged by the vacuum therein toward open position, a spring resisting opening movement of said valve, means for varying the action of said spring in accordance with the extent of depression of said pedal, means responsive to the hydraulic pressures in said system for rendering said spring ineffective to maintain said valve in closed condition, a second valve operatively connected in said booster mechanism for controlling the application thereof, said valve being urged by the vacuum developed in the booster mechanism to an open position, and means for controlling the operation of said second valve independently of the extent of depression of said pedal.

5. In combination with a hydraulic braking system, a vacuum booster mechanism operatively connected to said system, a source of vacuum, a conduit operatively connected to said source and to said booster mechanism, a valve in said conduit means including a second valve operable by vacuum conditions in said conduit for limiting the degree of vacuum applicable to said booster mechanism, means responsive to the hydraulic pressures developed in said hydraulic system for controlling said second valve, a third valve communicating with the conduit for limiting the degree of vacuum applicable to said booster mechanism independently of pressures developed in said hydraulic system, and check valve means interposed between said source of vacuum and said valves for maintaining in said conduit higher degrees of vacuum developed in said source of vacuum.

6. In combination with a hydraulic braking system, a vacuum booster mechanism operatively connected to said system, a source of vacuum, a conduit operatively connecting said source to said booster mechanism, a valve in said conduit, a second valve in communication with said conduit and operable by vacuum conditions in said conduit for limiting the amount of force applicable by said booster mechanism to said hydraulic system, means responsive to pressure developed in said hydraulic system for moving said valve, a third valve in communication with said conduit and operable independently of pressures within the hydraulic system for limiting the amount of force applicable to said system by said booster mechanism, said third valve communicating with said conduit at a point close to said source of vacuum, and check valve means interposed in said conduit adjacent said source and between said third valve and said source of vacuum.

7. In combination with a hydraulic braking system, a vacuum booster mechanism for operating said braking system, a source of vacuum, a valve controlling the connection of said source to said mechanism, a regulating valve for limiting the degree of vacuum applied to said mechanism, means responsive to the degree of pressure applied to said braking system for opening said regulating valve, and manual means applied to said regulating valve for regulating the degree of pressure required to relieve said valve.

8. In combination with a hydraulic braking system, a vacuum booster mechanism for operating said braking system, a source of vacuum, a valve controlling the connection of said source to said mechanism, a regulating valve for limiting the degree of vacuum applied to said mechanism, means responsive to the degree of pressure applied to said braking system for opening said regulating valve, manual means applied to said regulating valve for regulating the degree of pressure required to relieve said valve, a second relief valve connected to said source, and adjustable means for setting said second relief valve to open at a predetermined degree of vacuum.

9. In combination with a hydraulic braking system, a vacuum booster mechanism for operating said braking system, a source of vacuum, a valve controlling the connection of said source to said mechanism, means for relieving said source of vacuum upon the application of a predetermined applied pressure to said braking system, and additional means for relieving said source of vacuum when the pressure developed thereby reaches a predetermined amount.

SAMUEL F. ARBUCKLE.